Figure 1:
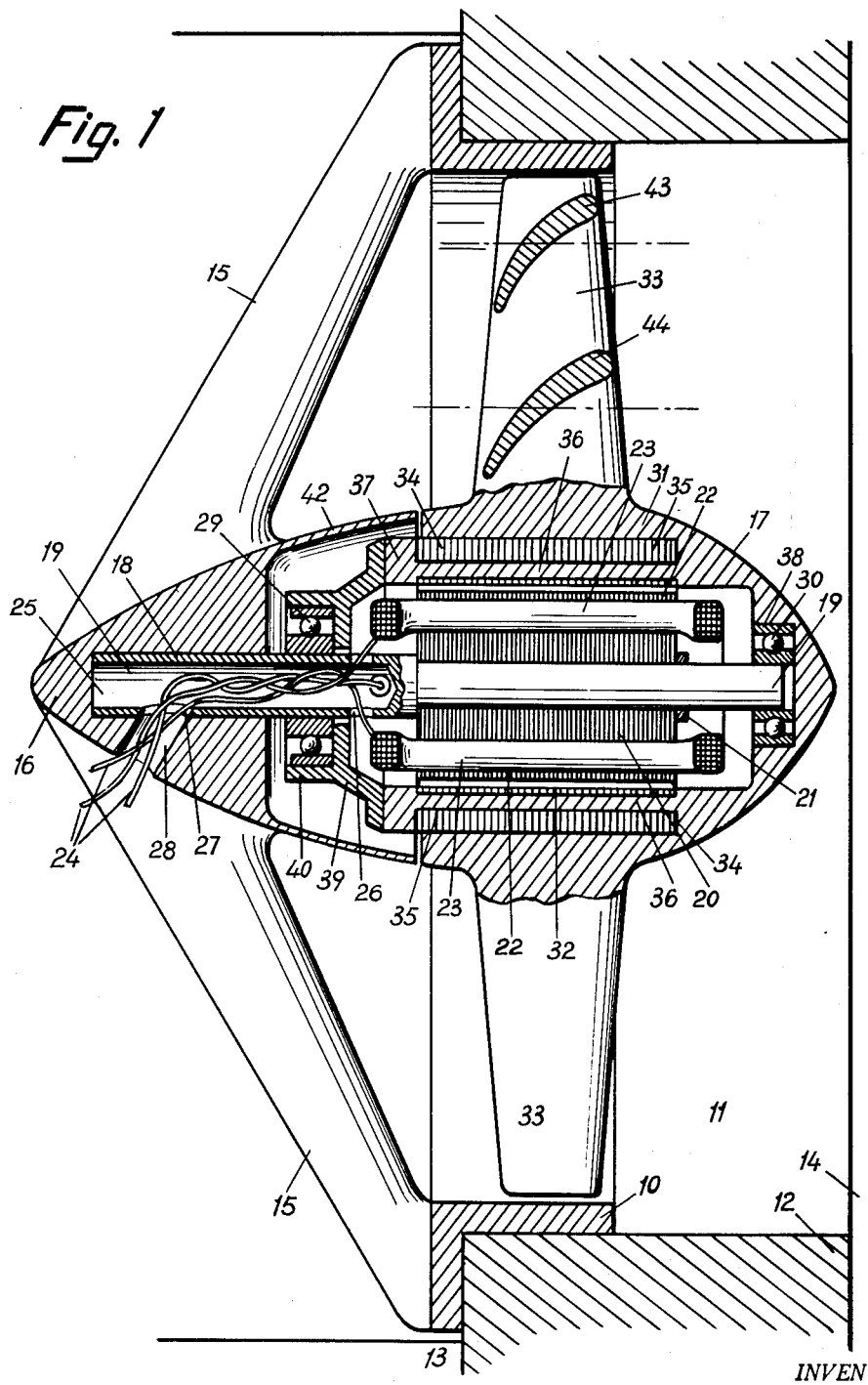

April 17, 1956     E. S. FONT     2,742,223
ELECTRIC PROPELLER FANS AND THE LIKE
Filed Jan. 2, 1953     2 Sheets-Sheet 1

INVENTOR.
E. Soler Font
BY
Glascott Downing Seebold
ATTYS.

April 17, 1956 E. S. FONT 2,742,223
ELECTRIC PROPELLER FANS AND THE LIKE
Filed Jan. 2, 1953 2 Sheets-Sheet 2
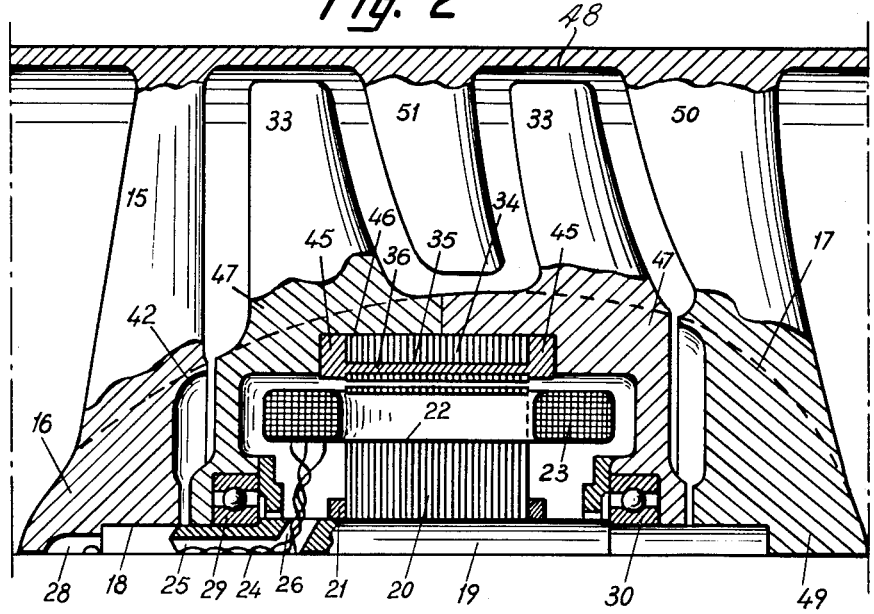
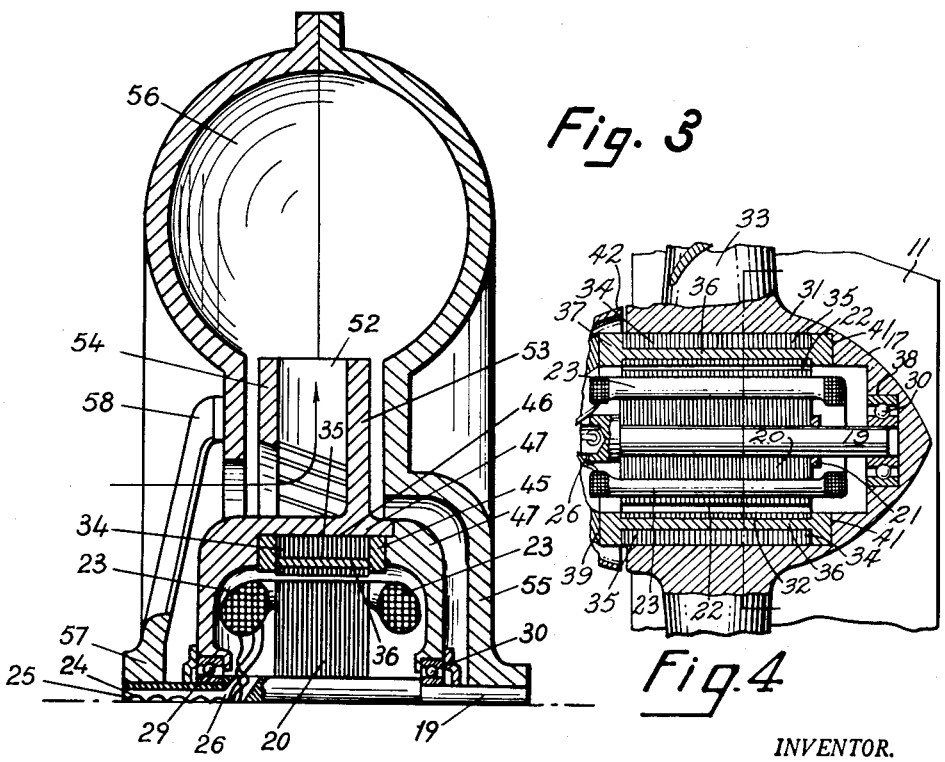
INVENTOR.
E. Soler Font
BY
ATTYS.

United States Patent Office 2,742,223
Patented Apr. 17, 1956

2,742,223

ELECTRIC PROPELLER FANS AND THE LIKE

Eduardo Soler Font, Barcelona, Spain

Application January 2, 1953, Serial No. 329,194

Claims priority, application Spain December 13, 1952

4 Claims. (Cl. 230—117)

The present invention relates to improved electric fans and the like.

Commonly the apparatus for moving fluids by means of the rotation of suitable blades, such as delivery or exhausting fans, either with centrifugal or axial flow, axial compressors, turbocompressors and the like, consists of a body housing an operating motor, from which motor protrudes the end of a shaft which carries the barrel for the blades or, in other instances, the said body contains only means for supporting the above blades in a revolving arrangement, the operating motor being placed at a given distance and connected with the described devices by means of suitable gearings.

At all events the elements which are surrounded by the fluid current thus produced must be streamlined or enclosed within suitably profiled covers whenever it is desired to obtain a fair aerodynamic efficiency, which, in many applications is very difficult in order to avoid a resulting ensemble which is bulky. This matter of size has particular importance in the cases wherein the fluid current produced is restricted within limits defined by ducts, tunnels and the like on account of the influence which it has on the actual passage sections.

The object of this invention is to provide some improvements in the apparatus and devices of the specified kind, by means of which it is possible to obtain far greater cooling effect of the windings and magnetic cores of the motor section of the device, thus allowing the construction of fans having a greater power to weight ratio and smaller size than the devices heretofore known.

To attain the above objects, the invention is based on the arrangement, in combination and as substantial elements, of a general support for the device, a shaft fixed thereto and having a portion substantially parallel to the direction of a fluid flow which is being driven, a core-plate pack fixed to said shaft portion so that it forms a substantially cylindrical body, peripheral slots extending from base to base of said cylindrical body and windings operatively arranged within said slots to produce a rotating magnetic field upon connection thereof to an alternating electric power supply, a second core-plate pack forming an annular body disposed around said cylindrical body, channels extending from base to base and adjacent to the inner surface thereof, a body of conducting material extending through the inside of these channels and at the bases of the annular body thus forming squirrel-cage bars and short circuit rings for same, a second body of conducting material closely fitted with the outer surface of said annular body and integral with said short circuit rings, profiled blades of conducting material integral therewith so that they are directly and thermically connected with the annular core-plate pack to dissipate rapidly the heat generated in said core-plate packs and motor windings, and supporting means for the annular ensemble, blades and squirrel-cage arranged in a freely revolving manner on said fixed shaft, to rotate said blades in dependence of the response of said squirrel-cage to said rotating field.

The described construction is very advantageous, as the squirrel-cage longitudinal bars and short-circuit rings constitute a member integral with the body or part supporting the core-plate pack, blades and rotating means for this ensemble onto the fixed shaft. By means of the modern injection moulding procedures, the said ensemble may be obtained as a single part formed of a good electrical and thermical conducting material, such as an aluminum alloy, hence attaining the further advantage of a minimum number of parts that can be rapidly assembled.

It may be desirable to have the annular body which fits onto the outer core-plate pack formed of a given number of separate parts independent with respect to the squirrel-cage, but at all events these parts will be closely fitted with at least a portion of the outer surface of said pack in order to ensure a perfect thermal conductivity between the functional parts of the motor and the blades.

Other and further objects of the invention will be apparent from the following detailed discussion of three preferred embodiments of the invention taken together with the accompanying drawings in which Figure 1 is a longitudinal diametral section of a fan according to the invention;

Figure 2 is a longitudinal partial section of an embodiment corresponding to an axial flow compressor, Figure 3 is a similar view corresponding to the application of the invention to a centrifugal compressor, and Figure 4 is a fragmentary sectional detail of a further modification of the form shown in Figure 1.

In the embodiment shown in Figure 1 the ring or frame 10 may be fixed to an opening 11 provided in a partition wall 12 defining two spaces 13 and 14, between which it is desired to produce a forced air circulation.

The frame 10 has a number of arms 15 which extend from the periphery to the central point thereof, wherein they converge forming a supporting body 16 which has an outer surface corresponding to a complete streamlined profile generally shown with the reference numeral 17.

The body 16 has an axial bore 18 wherein the end of a supporting shaft 19 is tightly fitted, said shaft extending longitudinally to the opening 11 and having fixed thereto a pack of magnetic core-plates 20 by means of a securing ring 21 or other fastening device providing the same effect. Pack 20 constitutes a stator inductor due to the fact that it is provided with longitudinal or slightly helical slots or grooves 22 wherein respective branches of windings 23 are disposed, said windings being specially designed and connected to produce a revolving magnetic field upon connection thereof to an alternating electric power supply. In the present embodiment it is supposed that the windings are arranged for a three phase alternating current feed by means of the three lines 24.

In order to lead these lines to the outside of the device, the end of shaft 19 which is fixed to the body 16 has an axial drill-hole 25 and three radial openings 26 adjacent to the windings 23. A further radial opening 27 in registration with a drill-hole 28 provided in the body 16 places the drill-hole 25 in communication with the outside, so that it is easy to put the lines 24 through the openings 26, drill-holes 25 and 28 and opening 27 and take them up to a suitable connection point.

The shaft 19 has mounted thereon two ball races 29 and 30. Race 29 is placed between the body 16 and pack 20, while race 30 is mounted on the free shaft end which protrudes from the opposite base of the pack. A revolving body 31 is mounted on these races and has an outer surface which completes the streamlined profile 17 and an inner surface adjacent to and tightly fitted with the outer surface of pack 20.

This body is moulded together with the blades 33, an annular core-plate pack 34 being previously fitted within the moulding die, so that the cylindrical inner surface thereof is at the same level as the surface 32. This core-plate pack is formed with a plurality of longitudinal channels 35 adjacent to the surface 32, which channels are likewise filled with the molten material thus forming squirrel-cage bars 36 placed in short-circuit by the same body 31 at the right hand side of Figure 1 and by means of a ring 37, likewise obtained and in the same operation, at the left hand side of Figure 1.

The body 31 has a housing 38 fitting directly onto the bearing race 30. The ring 37 has fixed thereto a sleeve 39 which surrounds the ends of the windings 23 and the openings for the passage of lines 24, said ring being likewise provided with a housing 40 which fits onto the race 29. By this arrangement, the squirrel-cage, body 31 and blades 33 associated with the latter are mounted in a freely revolving manner around the shaft 19. When the windings 23 are connected to a source of three phase alternating current, a revolving field is produced which drags along the squirrel-cage and all the elements therewith associated, thus making the blades revolve for driving a given fluid flow.

The squirrel-cage may be formed in the magnetic core-plate pack 20 independently of the body 31, thus forming an ensemble which can be tightly fitted in a suitable lodging, shown at 41 in Figure 4, and according to the Figures 2 and 3.

The profile 17 is completed by means of an extension 42 provided in the supporting body 16, which extension comes in close relation with the end of body 31, thus covering the sleeve 39 and bearing 29. Following the same construction, the blades 33 may be provided with the most suitable streamlined profiles, such as those shown by the cross-sections 43 and 44.

The embodiments illustrated in Figures 2 and 3 show an axial flow exhauster and a centrifugal turbocompressor, respectively.

In the embodiment of Figure 2, the annular core-plate pack 34 has mounted therein the corresponding bars 36 forming the squirrel-cage in combination with the short-circuit rings 45. This ensemble is forced to fit tightly within housings 46 provided in two parts 47, which, once coupled together, constitute a part equivalent to the body 31, thus ensuring a perfect contact and thermal conductibility. These parts carry the races 29 and 30 which are mounted on the fixed shaft 19 and respective sets of blades 33.

In this case the shaft 19 is supported at one end thereof by a body equivalent to that numbered 16 in Figure 1, associated with arms 15 suitably secured to the tubular body 48 of the device, and at the other end thereof by means of a similar body 49 in its turn connected to additional arms 50 likewise secured to the body 48.

The bodies 16 and 49, together with the parts 47 are formed with such an outline that they constitute a streamlined profile. The arms 50 are profiled to actuate as guiding blades similar to the blades 51 placed between the rotating blades 33.

In the embodiment shown in Figure 3, the arrangement, though schematic, as far as the motor group is concerned, is similar to that described, with the differentiating feature that the body 31 has blades 52 profiled to work centrifugally, for which purpose they are provided on one of the faces of a disc 53 integral with one of the parts 47 and strengthened by means of a ring 54. In this case, one of the extreme supports for the shaft 19 is constituted by the frame 55 of the turbocompressor, which frame extends radially and is formed with a volute 56 for collecting the fluid driven by the blades 52. If it is desired, the free end of the shaft 19 may be fixed to a support 57 held by arms 58, which arms are secured in its turn, to the frame 55.

It is obvious, of course, that various modifications such as shape and size, as well as suitable materials can be utilized in the present invention without departing from the scope thereof as defined in the appended claims.

I claim:

1. Improved electric fans and the like comprising in combination and as essential elements, a general support for the device, a shaft fixed thereto and having a portion substantially parallel to the direction of a fluid flow which is being driven, a magnetic core-plate pack fixed on said shaft portion so that it forms a substantially cylindrical body, peripheral slots extending from base to base of said cylindrical body and windings operatively arranged within said slots to produce a revolving magnetic field upon connection thereof to an alternating electric power supply, a second magnetic core-plate pack forming an annular body disposed around said cylindrical body, channels extending from base to base and adjacent to the inner surface thereof, a body made of conductor material extending through the inside of these channels and at the base of the annular body thus forming squirrel-cage bars and short-circuit rings for same, a second body of conductor material closely fitted with the outer surface of said annular body, said second body being integral with at least one of said short-circuit rings, profiled blades made of conductor material integral therewith so that they are directly and thermically connected with the annular core-plate pack and squirrel-cage to rapidly dissipate the heat generated in said core-plate packs and motor windings, and supporting means for the annular ensemble, blades and the squirrel-cage arranged in a freely revolving disposition on said fixed shaft, to rotate said blades in dependence of the response of said squirrl-cage to said revolving field.

2. Improved electric fans and the like comprising in combination and as essential elements, a general support for the device, a shaft fixed thereto and having a portion substantially parallel to the direction of a fluid flow which is being driven, a magnetic core-plate pack fixed on said shaft portion so that it forms a substantially cylindrical body, peripheral slots extending from base to base of said cylindrical body and windings operatively arranged within said slots to produce a revolving magnetic field upon connection thereof to an alternating current power supply, a second magnetic core-plate pack forming an annular body disposed around said cylindrical body, channels extending from base to base and adjacent to the inner surface thereof, a body made of conductor material extending through the inside of said channels and at the bases of the annular body thus forming squirrel-cage bars and short-circuit rings for same, at least a second annular body of conductor material tightly fitted with at least a portion of the outer surface of the said annular body and squirrel-cage rings, profiled blades made of conductor material integral with at least one of said second bodies so that they are directly and thermically connected with the annular core-plate packs and squirrel-cage to rapidly dissipate the heat generated in said core-plate packs and motor windings, and supporting means for said annular bodies, blades and squirrel-cage in a freely revolving disposition on said fixed shaft, to rotate said blades in dependence of the response of the squirrel-cage to said revolving field.

3. A device for moving fluids comprising in combination a support, a shaft fixed thereto and disposed parallel to the direction of fluid flow, a cylindrical magnetic core fixed on said shaft, windings in said core adapted to be connected to a source of electrical energy, a second cylindrical magnetic core surrounding and spaced from said first mentioned magnetic core, conductive material forming squirrel cage bars in said second cylindrical core, the said conductive material joining the said squirrel cage bars at one end thereof to form a short circuiting ring therefor, a body of conductive material surrounding said second cylindrical core and fixed for rotation therewith, fluid moving blades formed on said body, the said body forming a short circuiting ring at the other end of said squirrel cage bars, said short circuiting ring being externally constructed to present a streamlined face to the said moving fluid.

4. A device for moving fluids comprising in combination a support, a shaft fixed thereto and disposed parallel to the direction of fluid flow, a cylindrical magnetic core fixed on said shaft, windings in said core adapted to be connected to a source of electrical energy, a second cylindrical magnetic core surrounding said first mentioned magnetic core and rotatable with respect thereto, conductive material forming squirrel cage bars in said second cylindrical core, the said conductive material joining the said squirrel cage bars at one end thereof to form a short-circuiting ring therefor, a body of a conductive material surrounding said second cylindrical magnetic core and fixed for rotation therewith, fluid moving blades formed integral with said body, said blades disposed to move fluid toward the said one end of said squirrel cage bars, the said body forming a short-circuiting ring at the other end of said squirrel cage bars, said last mentioned short circuiting ring being externally constructed to present a streamlined face to the said fluid moving toward said blades.

References Cited in the file of this patent

UNITED STATES PATENTS

| | | |
|---|---|---|
| 1,632,357 | White | June 14, 1927 |
| 1,921,218 | Colby | Aug. 8, 1933 |
| 2,171,460 | Thrasher | Aug. 29, 1939 |
| 2,225,338 | Geiss | Dec. 17, 1940 |
| 2,482,847 | Godman | Sept. 27, 1949 |
| 2,634,375 | Guimbal | Apr. 7, 1953 |